TAPE PERFORATOR

Filed May 31, 1955 2 Sheets-Sheet 1

INVENTOR.
JACOB J. HAGOPIAN
BY Lippincott and Smith
ATTORNEYS

March 4, 1958 J. J. HAGOPIAN 2,825,406

TAPE PERFORATOR

Filed May 31, 1955 2 Sheets-Sheet 2

INVENTOR.
JACOB J. HAGOPIAN

BY Lippincott and Smith

ATTORNEYS

United States Patent Office 2,825,406

Patented Mar. 4, 1958

2,825,406

TAPE PERFORATOR

Jacob J. Hagopian, San Jose, Calif., assignor to International Business Machines Corporation, New York, N. Y., a corporation of New York Application May 31, 1955, Serial No. 511,998

2 Claims. (Cl. 164—113)

This invention relates to perforators for recording coded information by punching holes in tape, and in particular to improvements in high-speed multichannel perforators useful in digital recording systems.

Punched paper tape is among the least expensive media for recording digital information, and it has been used extensively for this purpose for telegraphy and other low-speed recording systems. A serious limitation upon the use of punched tape in other recording systems has been the relatively low operating speed of available perforators for punching holes in the tape to represent the coded information. Consequently, it has often been necessary to use more expensive recording media, such as magnetic tape or photographic film, in applications where the use of punched tape would have been advantageous if adequate perforation speeds had been attainable. Accordingly, a principal object of this invention is to provide a tape perforator capable of operation at substantially higher perforation rates than has heretofore been achieved. Another object is to provide an improved multichannel perforator for simultaneously recording several independent information signals at different lateral positions on the tape. Other objects and advantages will appear as the description proceeds.

Briefly stated, in accordance with one aspect of this invention, an improved tape perforator includes transport means for moving a tape lengthwise past a plurality of laterally spaced apart rod-shaped punches, which can be operated independently to punch holes at different lateral positions of the tape. An electric driver for each punch includes a driving winding upon a cylindrical coil form which is axially movable within a cylindrical air gap of a permanent magnet. Each punch is connected to its driver by a wire extending through, and axially movable within, a tube which prevents buckling of the wire. The rod-shaped punch is attached to and alined with one end of the wire, and the other end of the wire is attached to and alined with the cylindrical coil form so that axial movement of the coil form operates and retracts the punch.

This arrangement provides a low-inertia moving system which can be operated at high speed—for example, a punch cycle time of 5 milliseconds is easily attained. Since the tube and wire linkage can be bent by moderate amounts, a number of punches may be positioned quite close together for punching several channels on a relatively narrow paper tape, even though the size of the electric drivers requires that the drivers be spaced at considerably greater distances. To provide rapid and positive retraction of the punch, an electronic amplifier is used which supplies to the driving winding successive electric pulses of opposite polarity, so that the driver successively operates and retracts the punch in a rapid positive manner.

The invention will be better understood from the following description taken in connection with the accompanying drawings, and its scope will be pointed out in the appended claims. In the drawings, Fig. 1 is a simplified schematic diagram of a tape perforator embodying principles of this invention;

Figure 1:
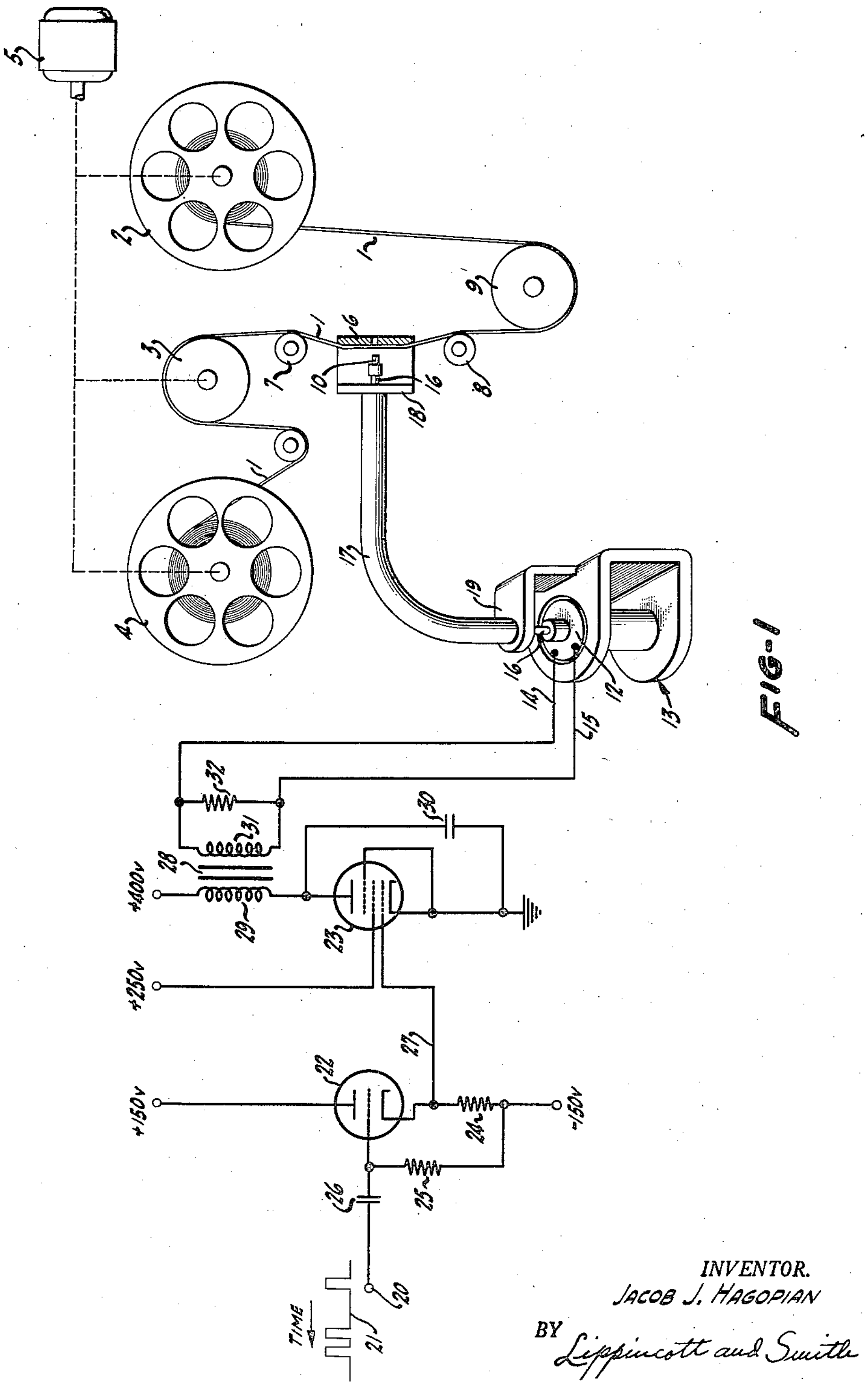

Referring now to Fig. 1 of the drawing, a tape 1 is supported and moved in a lengthwise direction by a tape transport system, illustrated in simplified form, which includes a supply reel 2, a drive clutch 3, and a take-up reel 4. Drive clutch 3 and reels 2 and 4 are rotated by an electric motor 5 so that tape is unwound from reel 2, is moved lengthwise through the transport system at a speed of about ten to thirteen inches per second, and is wound upon reel 4. Tape 1 preferably is opaque paper about 3 mils thick and any convenient width, depending upon the number of channels to be punched into the tape, suitable for photoelectric reading of the punched information. Tape 1 moves across a die 6, and is kept in contact with the die by pins 7 and 8 and by tension applied to the tape by a brake 9.

A punch 10 is positioned on the opposite side of tape 1 from die 6. The punch 10 can be forced through the tape into and out of a mating hole 11 of die 6 to punch holes in tape 1 at selected times. Other punches, not shown in Fig. 1, may be provided for punching holes at different lateral positions on tape 1. In a preferred embodiment hereinafter more fully described, punch 10 is a rigid steel rod having a diameter of about 20 mils.

An electric driver for operating the punch includes a cylindrical coil form 12 axially movable within a cylindrical air gap, between pole pieces of a permanent magnet 13. Leads 14 and 15 are connected to a winding upon the circumference of coil form 12, so that currents supplied to this winding through leads 14 and 15 provide forces moving coil form 12 axially within the air gap. This winding and magnet structure is similar to that used in permanent magnet type radio loudspeakers, and can be designed to operate with very short cycle times.

A mechanical linkage between the electric driver and the punch 10 consists of a flexible wire 16 extending through and axially movable within a metal tube 17. Punch 10 is axially alined with and attached to one end of wire 16, and the other end of wire 16 is attached to and alined with coil form 12, so that axial movement of coil form 12 moves punch 10 into and out of hole 11 for punching holes in tape 1. Wire 16 preferably is a steel push wire about 16 mils in diameter, and tube 17 preferably is a stainless steel tube having an internal diameter of 20 mils, so that wire 16 can slide freely within tube 17, but cannot buckle substantially under compressive forces.

One end of tube 17 is supported in fixed spatial relation to die 6 by a bracket 18, and the other end of tube 17 is held in fixed spatial relation to magnet 13 by a bracket 19. Preferably, adjusting means are provided, as hereinafter described, for adjusting the spacing between tube 17 and magnet 13 for adjusting the position of punch 10 relative to die 6. Tube 17 may be bent moderately for locating the electrical driver in a convenient position, and in particular to make possible the use of several punches positioned close to one another.

The coded information which is to be recorded on tape 1 is supplied to the amplifier input terminal 20 of the tape perforator in the form of electric voltage pulses occurring at selected times. A plurality of such pulses are represented at 21 in Fig. 1. Preferably, each pulse has a duration of about 2.5 milliseconds. It is desired that punch 10 should operate to punch a hole in tape 1 each time that a voltage pulse is supplied to the amplifier input terminal 20, so that the information will be recorded on tape 1 in the form of holes spaced apart at selected intervals along the length of the tape. Other information may be recorded by holes punched in a similar manner at other lateral positions on the tape.

A preferred amplifier includes two grid-controlled electron discharge devices, one of which is a triode 22 and the other of which is a pentode 23. Conventional voltage supply means, not shown, provide operating voltages as indicated in the drawing to various parts of the amplifier circuit. Triode 22 has an anode connected to a potential of +150 volts, and a cathode connected through a load resistor 24 to a potential of —150 volts. The control grid of triode 22 is connected to a grid leak resistor 25 and is also connected through a capacitor 26 to the input terminal 20 of the amplifier. The circuit of triode 22 is a cathode follower, which supplies voltage pulses through lead 27 to the control grid of pentode 23. The cathode of pentode 23 is conected to ground, and the pentode is biased to a nonconductive state by a negative voltage normally supplied to its control grid through lead 27. However, when a positive voltage pulse is supplied to input terminal 20, the cathode follower supplies a positive pulse through lead 27 and pentode 23 becomes momentarily conductive.

A pulse transformer 28 has a primary 29 connected to a potential of +400 volts and also connected in series with a capacitor 30. Pentode 23 is connected in parallel with capacitor 30, as shown. Transformer 28 has a secondary 31 connected to the electric driver through leads 14 and 15. Preferably, a resistor 32 is also connected to cross secondary 31. Transformer 28 may be a Stancor-type A–8103 connected as a stepdown transformer, pentode 23 may be a type 807 vacuum tube, capacitor 30 may have a value of 0.1 microfarad, resistor 32 may have a value of 47 ohms, and the winding of the electric driver may have a resistance of 7.5 ohms.

When pentode 23 is nonconductive, capacitor 30 charges to a potential of +400 volts, and the voltage across transformer primary 29 is zero. When a positive pulse is supplied to amplifier input terminal 21, pentode 23 becomes conductive, and capacitor 30 discharges through the pentode. This suddenly applies almost 400 volts across primary 29, so that an increasing pulse of current flows through the transformer primary, and secondary 31 supplies a pulse of about 18 volts to the electric driver. In response to the pulse from secondary 31, coil form 12 moves upward and forces one end of wire 16 inward with respect to tube 17. The other end of wire 16 is forced outward with respect to tube 17, and punch 10 is pushed through tape 1 into hole 11 of die 6.

Upon termination of the positive pulse applied to input terminal 21, pentode 23 again becomes nonconductive, and the current through primary 29 quicky charges capacitor 30 to a positive potential greater than 400 volts. Consequently, the voltage across primary 29 is reversed in polarity and the current through the primary begins to decrease. Now secondary 31 supplies to the electric driver a pulse of the opposite polarity and a peak value of about 20 volts. In consequence, coil form 31 is forcibly moved downward, whereupon punch 10 is quickly and positively retracted from hole 11 and from the hole recently punched in tape 1.

The current through primary 29 reverses direction for a sufficient time interval to permit capacitor 30 to discharge to a potential of +400 volts. Because transformer 28 is heavily loaded by the low impedance of the electric driver and resistor 32 in parallel, the resonant circuit is damped sufficiently to prevent further oscillations. Preferably, each of the two pulses of opposite polarity applied successively to the driver has a duration of about 2.5 milliseconds, and the minimum cycle time of the punch is about 5 milliseconds.

Figure 2:
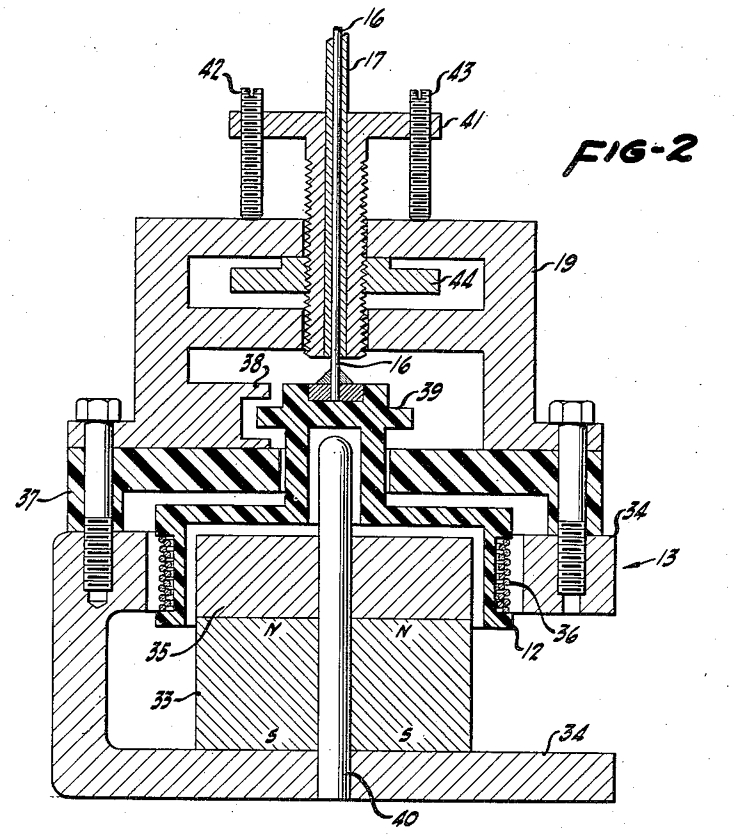
Fig. 2 is a section showing a preferred form of the electric driver.

Reference is now made to Fig. 2, which illustrates a preferred form of the electric driver. A permanent magnet assembly, indicated generally at 13, preferably comprises an axially magnetized cylinder of a good permanent magnet material, such as Alnico V, and two iron pole pieces 34 and 35 having the shape shown to define a cylindrical air gap. A cylindrical coil form 12 preferably is made of a tough, light-weight plastic material such as Teflon. Coil form 12 extends into and is axially movable within the cylindrical air gap of magnet 13, and supports within the air gap a winding 36 which is connected to leads 14 and 15 of the circuit shown in Fig. 1. In a preferred embodiment, winding 36 is made from No. 34 wire wound with 95 turns in two layers, and has a resistance of 7.5 ohms.

A phenolic base 37 and a bracket 19 are attached to magnet assembly 13 by suitable means, such as the screws illustrated in the drawing. Bracket 19 includes a travel stop fork 38 which cooperates with a collar 39 attached to coil form 12 to prevent overtravel of the coil form. A central post 40 assists in keeping the coil form and the magnet parts in axial alinement.

Tube 17 is attached to a screw-shaped anchor 41 which can be adjusted in position relative to bracket 19. Set screws 42 and 43 which extend through the head of screw 41 into contact with the top of bracket 19, and a lock nut 44—which is positioned within a slot of bracket 19, as shown, and engages the threads of screw 41—may be adjusted to change the spacing between the end of tube 17 and magnet assembly 13. Such adjustment moves wire 16 relative to tube 17, and thus can be used to adjust the position of punch 10 relative to die 11. The end of wire 16 is alined with and connected to coil form 12 in the manner shown, so that axial movement of the coil form moves wire 16 back and forth within tube 17 and thus alternately operates and retracts punch 10.

Figure 3:
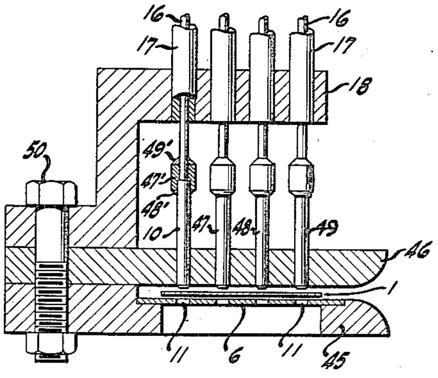
Fig. 3 is a section showing a punch and die assembly.

Refer now to Fig. 3, which shows a punching head having four punches laterally spaced apart and independently operable for punching holes in four different lateral positions of tape 1. Although four punches are illustrated in the drawing, it will be understood that a smaller or a larger number of punches may be used, depending upon the number of information channels to be recorded. As many as twelve punches may be employed to record twelve information channels on a tape about one inch wide.

The punching head includes two jaws or members 45 and 46 spaced apart to form a slot for receiving tape 1, as shown. A plurality of rod-shaped punches, 10, 47, 48 and 49, extend through member 46 into the slot containing tape 1. Opposite the punches, member 45 has an aperture covered by a die 6 having four holes 11 alined and mating with the four punches. When the punches are operated, each punch moves through tape 1 into the mating hole of die 6, and then is quickly retracted to its initial position so that a clean hole is punched through the tape. The punches preferably are each a hard, rigid steel rod about 20 mils in diameter, and the punches may be made, for example, from the shanks of No. 75 drill rods. The punching ends of the punches are slightly bevelled, as shown, for best results. The die 6 may be a sheet of spring steel about 4 mils thick, and the holes 11 may be made by manually forcing the punches through the die and then running in at high speed to obtain adequate clearance.

Each of the punches is alined with and attached to a steel push wire which extends through the length of a steel tube. For example, punch 10 is attached to wire 16 which extends through tube 17, as hereinbefore explained. The other ends of the four push wires are connected to four electric drivers similar to the drivers shown in Fig. 2, so that each of the four punches can be operated independently. Punch 10 is connected to the end of wire 16 by means of a metal connector sleeve 47′ which is soldered or otherwise securely attached to punch 10 at 48′ and is soldered or otherwise securely attached to wire 16 at 49′. The ends of the metal tubes are supported in fixed spatial relation to members 45 and 46, and to die 6, by a bracket 18 which is attached to members 45 and 46 by suitable means such as bolt 50.

It will be understood that this invention is not limited to the specific embodiment herein illustrated and described, and that the following claims are intended to cover all changes and modifications which do not depart from the true spirit and scope of the invention.

What is claimed is:

1. A perforator comprising a punch, an electric driver for said punch, voltage supply means, a capacitor, a transformer having a primary and a secondary, said secondary being connected to said driver, said capacitor and said primary being connected in series to said voltage supply means, a grid-controlled discharge device connected in parallel with said capacitor, means biasing said device to be non-conductive, and means supplying a voltage pulse to make said device momentarily conductive, whereby voltage pulses of opposite polarity are successively supplied to said driver for successively operating and retracting said punch.

2. A high-speed tape perforator comprising a magnet having a cylindrical air gap, a cylindrical coil form extending into said air gap and axially movable therein, a low-impedance driving winding upon said coil form, a rigid rod-shaped punch and a mating die, a bent tube, means supporting one end of said tube in alinement with and in fixed spatial relation to said die, means supporting the other end of said tube in alinement with and in adjustable spatial relation to said magnet, a flexible push wire extending through the length of said tube and axially movable therein, one end of said wire being axially alined with and attached to said coil form and the other end of said wire being axially alined with and attached to said punch so that axial movement of the coil form operates the punch, voltage supply means, a capacitor, a transformer having a primary and a secondary, said secondary being connected to said driving winding, a resistor connected across said secondary in parallel with said driving winding, said capacitor and said primary being connected in series to said voltage supply means, a grid-controlled discharge device connected in parallel with said capacitor, means biasing said device to be nonconductive, and means supplying a voltage pulse to make said device momentarily conductive, whereby voltage pulses of opposite polarity are successively supplied to said driver for successively operating and retracting said punch, the low impedance of said driving winding and said resistor in parallel damping said transformer secondary to prevent oscillation of the secondary voltage.

References Cited in the file of this patent

UNITED STATES PATENTS

| | | |
|---|---|---|
| 141,755 | Edison | Aug. 12, 1873 |
| 307,884 | Van Depoele | Nov. 11, 1884 |
| 933,759 | Johnholtz | Sept. 14, 1909 |
| 2,063,614 | McFarlane et al. | Dec. 8, 1936 |
| 2,118,230 | Rice | May 24, 1938 |
| 2,118,862 | Rayment et al. | May 31, 1938 |
| 2,210,552 | Maul | Aug. 6, 1940 |
| 2,307,424 | Savage | Jan. 5, 1943 |
| 2,708,020 | Wockenfuss | May 10, 1955 |